United States Patent
Henry et al.

(10) Patent No.: US 10,609,147 B2
(45) Date of Patent: Mar. 31, 2020

(54) TARGET WAKE TIME AND GROUPING SCHEME FOR IOT TRANSMITTERS

(71) Applicant: Cisco Technology, Inc., San Jose, CA (US)

(72) Inventors: Jerome Henry, Pittsboro, NC (US); Robert Edgar Barton, Richmond (CA); Rajesh S. Pazhyannur, Fremont, CA (US); Kedar Krishnanand Gaonkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/987,140

(22) Filed: May 23, 2018

(65) Prior Publication Data

US 2019/0364110 A1    Nov. 28, 2019

(51) Int. Cl.
*H04L 29/08*    (2006.01)
*H04L 5/00*    (2006.01)
*H04B 7/0452*    (2017.01)

(52) U.S. Cl.
CPC ........... *H04L 67/12* (2013.01); *H04B 7/0452* (2013.01); *H04L 5/0007* (2013.01)

(58) Field of Classification Search
CPC ............. H04W 52/02; H04W 52/0206; H04W 52/0219; H04W 72/0466; H04W 72/12; H04W 76/28; H04W 84/12; H04W 88/08; Y02D 70/00
See application file for complete search history.

(56) References Cited

U.S. PATENT DOCUMENTS

| 9,462,550 B2 | 10/2016 | Jafarian et al. |
| 9,538,368 B2 | 1/2017 | Seok et al. |
| 2012/0231828 A1* | 9/2012 | Wang ............ H04W 74/06 455/509 |

(Continued)

FOREIGN PATENT DOCUMENTS

CN    106998582 A    8/2017

OTHER PUBLICATIONS

Santiago, Elena S., "Passive Positioning Approaches in the future positioning systems", Master of Wireless Communication thesis, 83 pages, May 2017, Tampere University of Technology.

(Continued)

*Primary Examiner* — Un C Cho
*Assistant Examiner* — Peter K Mak
(74) *Attorney, Agent, or Firm* — Behmke Innovation Group LLC; James Behmke; Stephen D. LeBarron

(57) ABSTRACT

In one embodiment, a device in a network determines behavioral profiles of a plurality of nodes in the network. The behavioral profile for a particular node indicates whether the node is an occasional transmitter or a periodic transmitter. The device identifies similarly behaving nodes based on their behavioral profiles. The device assigns groups of the nodes to uplink transmission windows based on their behavioral profiles. The similarly behaving nodes that are periodic transmitters are assigned to the same uplink transmission windows and similarly behaving nodes that are occasional transmitters are assigned to different uplink transmission windows. The device controls the plurality of nodes to use their assigned uplink transmission windows via target wake time values sent to the plurality of nodes.

20 Claims, 8 Drawing Sheets

(56) References Cited

U.S. PATENT DOCUMENTS

| | | | | |
|---|---|---|---|---|
| 2014/0314054 A1* | 10/2014 | Seok | ............... | H04W 8/26 |
| | | | | 370/336 |
| 2015/0201432 A1* | 7/2015 | Rong | ............... | H04L 5/0053 |
| | | | | 370/330 |
| 2016/0269993 A1* | 9/2016 | Ghosh | ............... | H04W 52/0229 |
| 2018/0132175 A1* | 5/2018 | Choi | ............... | H04W 52/02 |

OTHER PUBLICATIONS

Tian, et al., "Real-Time Station Grouping under Dynamic Traffic for IEEE 802.11 ah", Sensors (Basel), 17(7): 1559, https://www.ncbi.nlm.nih.gov/pmc/articles/PMC5539835/, 21 pages, 2017, MDPI.

"Introduction to 802.11 ax High-Efficiency Wireless", http://www.ni.com/white-paper/53150/en/, Jul. 24, 2017, 10 pages, National Instruments.

"Special Topic: 5G New Radio (NR): Standard and Technology", ZTE Communications, vol. 15 No. S1 (Issue 57), An International ICT R&D Journal Sponsored by ZTE Corporation, Jun. 2017, 72 pages, ZTE Corporation.

https://en.wikipedia.org/wiki/IEEE_802.11ax; IEEE 802.11ax—Wikipedia; pp. 1-12.

https://en.wikipedia.org/wiki/IEEE_802.11ac; IEEE 802.11ac—Wikipedia; pp. 1-14.

https://en.wikipedia.org/wiki/IEEE_802.11ah; IEEE 802.11ah—Wikipedia; pp. 1-8.

Lear et al. "Manufacturer Usage Description Specification draft-ietf-opsawg-mud-20" Network Working Group; Apr. 9, 2018; pp. 1-58.

\* cited by examiner

TARGET WAKE TIME AND GROUPING SCHEME FOR IOT TRANSMITTERS

TECHNICAL FIELD

The present disclosure relates generally to computer networks, and, more particularly, to a target wake time and grouping scheme for Internet of Things (IoT) transmitters.

BACKGROUND

The Internet of Things, or "IoT" for short, represents an evolution of computer networks that seeks to connect many everyday objects to the Internet. Notably, there has been a recent proliferation of "smart" devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room, when a person enters the room.

The recent Institute of Electrical and Electronics Engineers (IEEE) wireless standard 802.11ah introduced the concept of a Target Wake Time (TWT), to allow stations that occasionally need to transmit to sleep longer. At the same time, TWT allows a wireless access point to split a large population of IoT clients into groups that contend at different times, limiting the contention and collision risks to subsets of the client population for a given time period. The underlying idea of this mechanism was to divide a cell in quadrants where clients transmit in turns.

IEEE 802.11ax reuses the TWT concept. 802.11ax also introduces Orthogonal Frequency-Division Multiple Access (OFDMA) and Uplink-Multiple User, Multiple-Input, Multiple-Output (UL-MUMIMO) modes. These modes allow an access point to cause spatially diverse client stations (STAs) to send uplink traffic at the same time over different streams, in UL-MUMIMO mode, or by allowing the access point to schedule each STA to only use a subset of the uplink transmission frame, in OFDMA mode.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
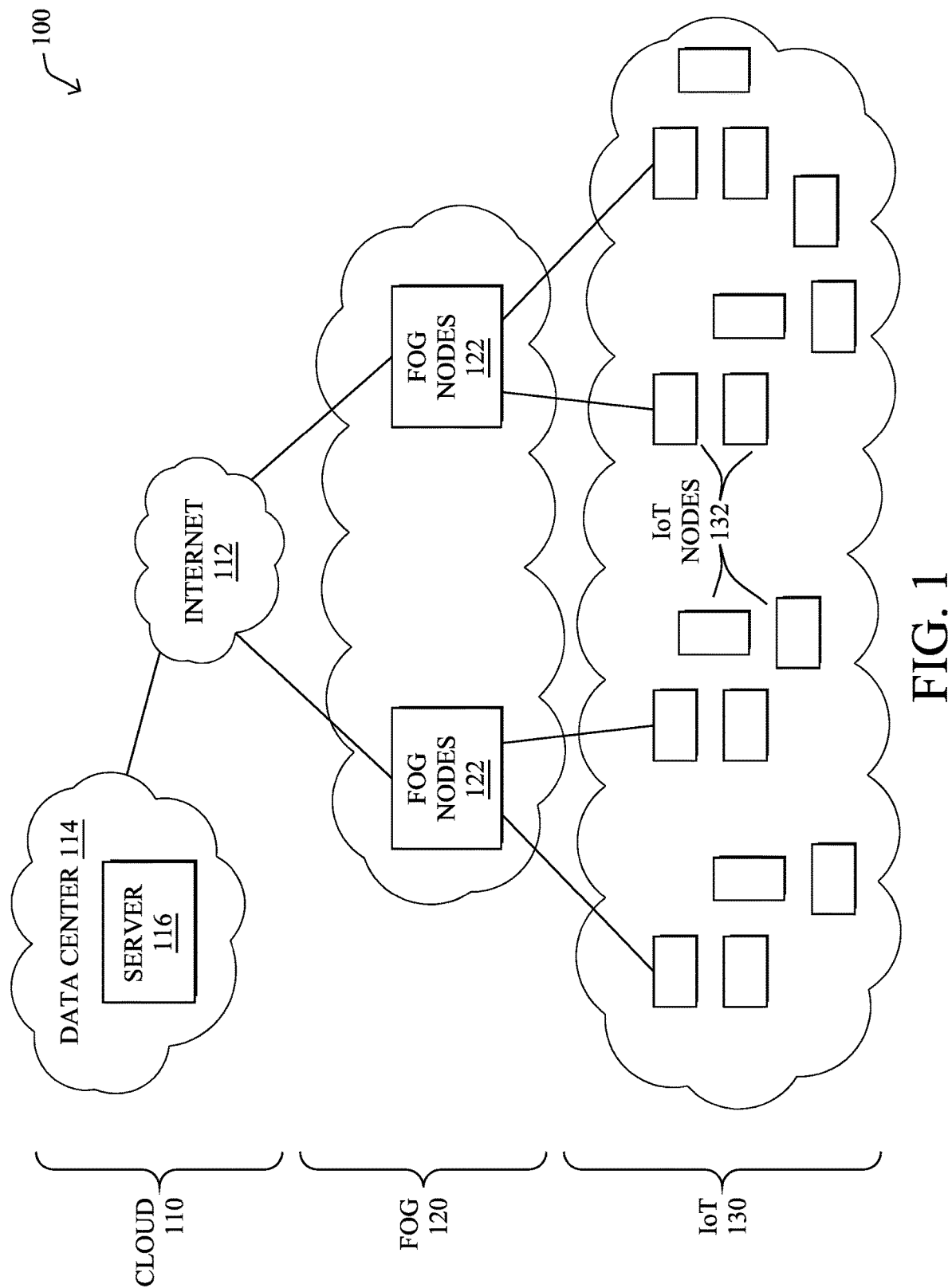
FIG. 1 illustrates an example computer network.

According to one or more embodiments of the disclosure, a device in a network determines behavioral profiles of a plurality of nodes in the network. The behavioral profile for a particular node indicates whether the node is an occasional transmitter or a periodic transmitter. The device identifies similarly behaving nodes based on their behavioral profiles. The device assigns groups of the nodes to uplink transmission windows based on their behavioral profiles. The similarly behaving nodes that are periodic transmitters are assigned to the same uplink transmission windows and similarly behaving nodes that are occasional transmitters are assigned to different uplink transmission windows. The device controls the plurality of nodes to use their assigned uplink transmission windows via target wake time values sent to the plurality of nodes.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services, on a dedicated basis or on top of other primary functions. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, a fog node 122 may operate as a root node for IoT nodes 132 in a local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
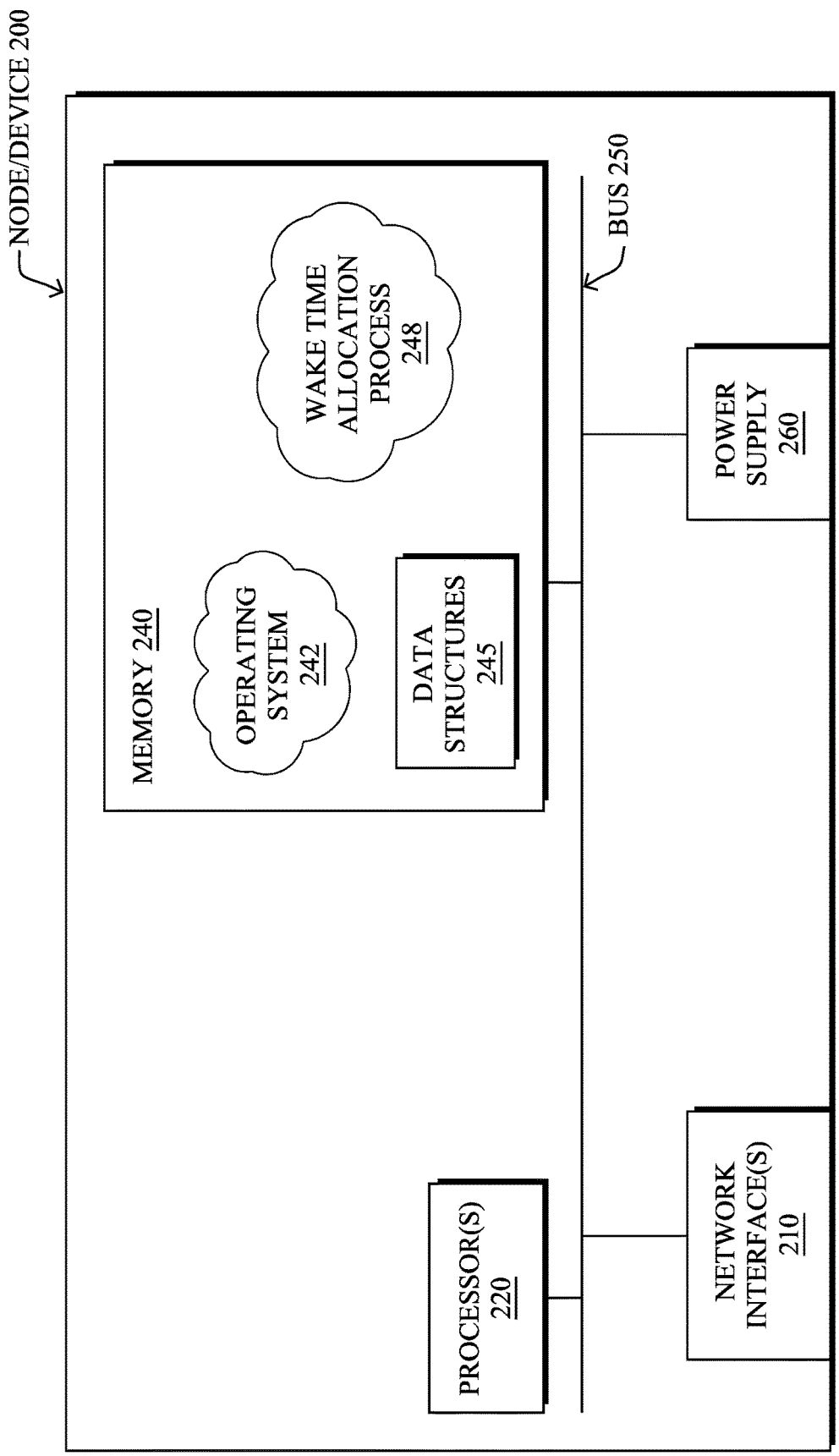
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative wake time allocation process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In general, wake time allocation process 248 may be configured to make target wake time allocations in a wireless network based on the profiles of nodes/devices in a network. In various embodiments, wake time allocation process 248 may assess captured telemetry data regarding one or more traffic flows, to determine the behavioral profile of a device in the network. Wake time allocation process 248 may employ any number of machine learning techniques, to classify the gathered traffic data and/or assign target wake times to the network devices. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, wake time allocation process 248 can use the model M to classify new data points, such as information regarding new traffic flows in the network. Often, M is a statistical model, and the cost function is inversely proportional to the likelihood of M, given the input data.

In various embodiments, wake time allocation process 248 may employ one or more supervised, unsupervised, or semi-supervised machine learning models. Generally, supervised learning entails the use of a training set of data, as noted above, that is used to train the model to apply labels to the input data. For example, the training data may include sample traffic data for different device types. On the other end of the spectrum are unsupervised techniques that do not require a training set of labels. Notably, while a supervised learning model may look for previously seen behavioral patterns that have been labeled as such, an unsupervised model may instead look to whether the behavior of a certain device matches that of an existing device type for which a behavioral model exists. Semi-supervised learning models take a middle ground approach that uses a greatly reduced set of labeled training data.

Example machine learning techniques that wake time allocation process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

In some cases, wake time allocation process 248 may assess the captured traffic data on a per-flow basis. In other embodiments, wake time allocation process 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

As noted above, the Institute of Electrical and Electronics Engineers (IEEE) 802.11ax standard reuses the Target Wake Time (TWT) concept introduced in the 802.11ah standard. 802.11ax also introduces Orthogonal Frequency-Division Multiple Access (OFDMA) and Uplink-Multiple User, Multiple-Input, Multiple-Output (UL-MUMIMO) modes. These modes allow an access point to cause spatially diverse client stations (STAs) to send uplink traffic at the same time over different streams, in UL-MUMIMO mode, or by allowing the access point to schedule each STA to only use a subset of the uplink transmission frame, in OFDMA mode.

However, the 802.11ah and 802.11ax standards do not describe how TWT should be implemented, or how STA grouping should happen for either of the above-mentioned uplink modes beyond basic radio frequency (RF) compatibility. In a population of IoT nodes/devices, it is expected that most STAs will be static in position (e.g., a window sensor is unlikely to move if the window itself does not move, etc.). Therefore, the RF conditions of most STA uplinks are likely to follow the general conditions of the RF environment in the cell. Other stations may be mobile. Additionally, in case of emergency, any scheduling should take into account parameters that are beyond the simple RF conditions.

Target Wake Time and Grouping Scheme for IoT Transmitters

The techniques herein introduce a target wake time grouping and scheduling scheme that extends uplink OFDMA and UL-MUMIMO modes in 802.11ax and similar networks. In some aspects, the techniques herein characterize transmissions of the IoT devices, to group transmitters based on their transmission needs (e.g., interval/volume, etc.), predictability, duration, variation, and/or emergency levels. In turn, the techniques herein use these groupings to allocate UL-MUMIMO or OFDMA frame slots, to optimize the upstream utilization of the link. In further aspects, the techniques herein also allow for the allocations to be changed dynamically based on environmental conditions (e.g., fire alarms, etc.).

Specifically, according to one or more embodiments of the disclosure as described in detail below, a device in a network determines behavioral profiles of a plurality of nodes in the network. The behavioral profile for a particular node indicates whether the node is an occasional transmitter or a periodic transmitter. The device identifies similarly behaving nodes based on their behavioral profiles. The device assigns groups of the nodes to uplink transmission windows based on their behavioral profiles. The similarly behaving nodes that are periodic transmitters are assigned to the same uplink transmission windows and similarly behaving nodes that are occasional transmitters are assigned to different uplink transmission windows. The device controls the plurality of nodes to use their assigned uplink transmission windows via target wake time values sent to the plurality of nodes.

Illustratively, the techniques described herein may be performed by hardware, software, and/or firmware, such as in accordance with the wake time allocation process 249, which may include computer executable instructions executed by the processor 220 (or independent processor of interfaces 210) to perform functions relating to the techniques described herein, e.g., in conjunction with wake time allocation process 248.

Figure 3:
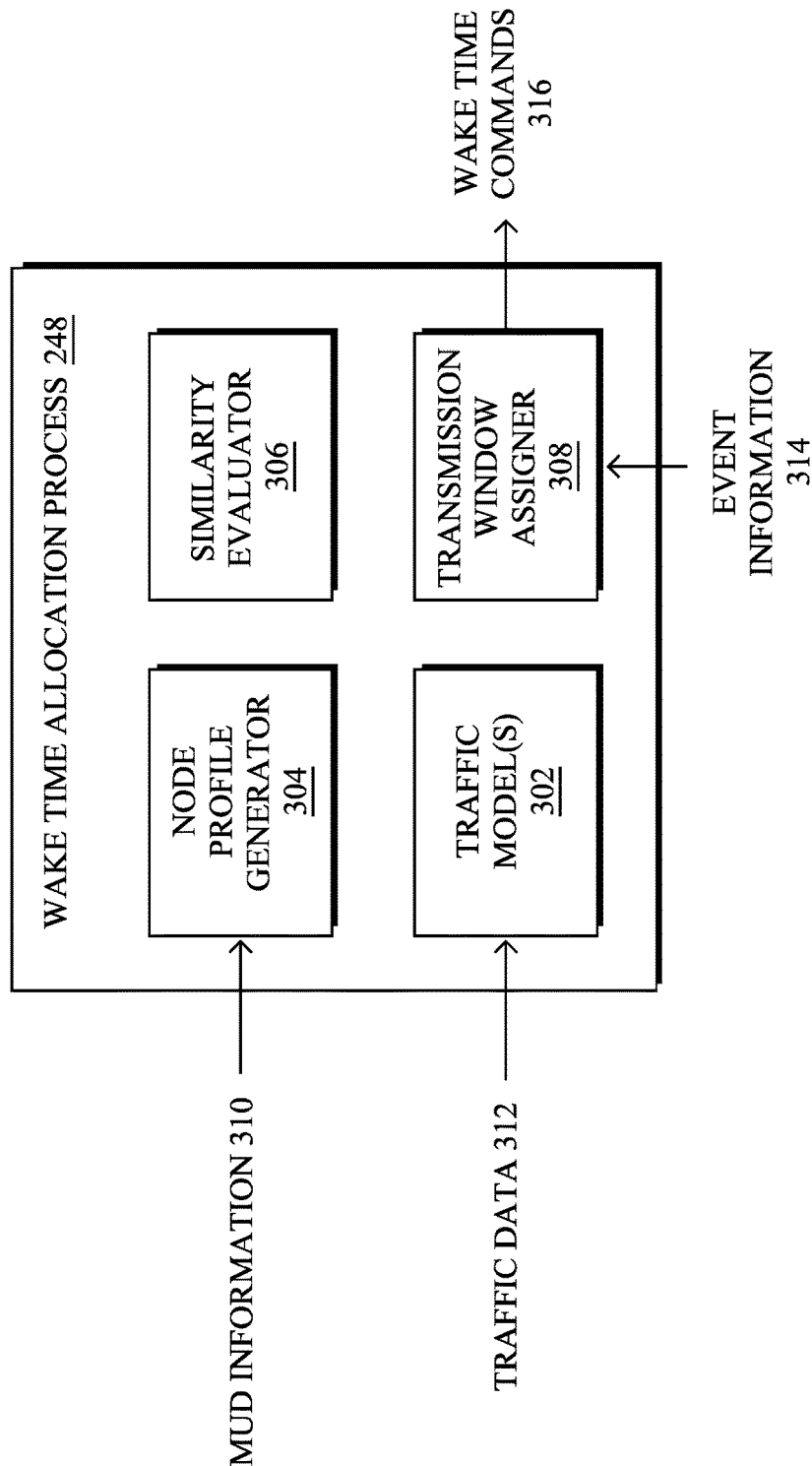
FIG. 3 illustrates an example architecture for allocating target wake times in a wireless network.

Operationally, FIG. 3 illustrates an example architecture for allocating target wake times in a wireless network, according to various embodiments. At the core of architecture 300 is wake time allocation process 248, which may be executed by a node/device 200 in a network, such as a wireless controller for one or more access points (APs), an AP, or any other device in communication therewith. As shown, wake time allocation process 248 may comprise any or all of the following components: one or more traffic models 302, a node profile generator 304, a similarity evaluator 306, and/or a transmission window assigner 308. As would be appreciated, these components may be implemented in a distributed manner or implemented as their own stand-alone services, either as part of the local network under observation or as a remote service. In addition, the functionalities of the components of architecture 400 may be combined, omitted, or implemented as part of other processes, as desired.

In general, when target wake times are used in a wireless network, each node is provided a wake time value via their corresponding access point. In turn, the node may enter into a sleep mode after which the node is allowed to transmit one upstream frame. Independent of the target wake time mechanism, the access point can also use a trigger frame to allow one or more nodes to transmit at the same time, either over multiple streams using UL-MUMIMO or over a single OFDMA frame.

In various embodiments, architecture 400 may be operable to optimize each upstream OFDMA or UL-MUMIMO frame by organizing transmitters/nodes into coherent groups, based on their behavioral profiles. As the concurrent uplink transmission of multiple nodes must finish at the same time, such a grouping may be made to allow alike transmissions to coexist within a single frame (e.g., filling the OFDMA slots, if possible). For illustrative purposes, the techniques herein are described with respect to architecture 400 assigning devices to be allocated transmission of resource units with OFDMA, these techniques can be applied to any form of uplink transmission window that allows for the concurrent transmissions by a group of devices, such as using UL-MUMIMO or the like.

To schedule uplink transmissions by the network nodes, architecture 400 may take into account the behavioral profiles of the nodes, such as their transmission patterns and needs. Notably, any given node does not need to be allowed to send traffic in each uplink transmission window. Accordingly, architecture 400 can issue wake time commands 316, such as target wake time values, to a node, thereby allowing the node to sleep during transmission windows that are not assigned to the node.

In various embodiments, wake time allocation process 248 may include node profile generator 304 configured to determine the behavioral profiles of the nodes in the wireless network (e.g., IoT devices/nodes, etc.). Generally speaking, the behavioral profile of a node quantifies the uplink transmission needs of the node. For example, in some embodiments, the behavioral profiles determined by node profile generator 304 may categorize a node as falling into one of two categories:

Type 'O'—Nodes of this type are occasional transmitters. This group includes sensors that publish information based on thresholds (e.g. temperature, pressure, movement detection etc.). A behavioral characteristic of transmitters in this group is that they may need to transmit at any time, and may or may not need to send during the next interval period.

Type 'P'—Nodes of this type are periodic transmitters. This group includes nodes that send values at regular intervals (e.g., CoAP clients in Observe mode, etc.), or at a constant feed (e.g., cameras, other sensors, etc.). A behavioral characteristic of the nodes of this type is that the periodicity of their transmissions makes their traffic flows predictable over the course of time.

In some embodiments, node profile generator 304 may determine the behavioral profile of a node based on Manufacturer Usage Description (MUD) information 310. Details regarding MUD can be found in the IETF draft entitled "Manufacturer Usage Description Specification" by E. Lear et al. In general, MUD allows information about a node to be included in a MUD file that is available from a MUD uniform resource indicator (URI), typically provided by the manufacturer of the node.

Figure 4:
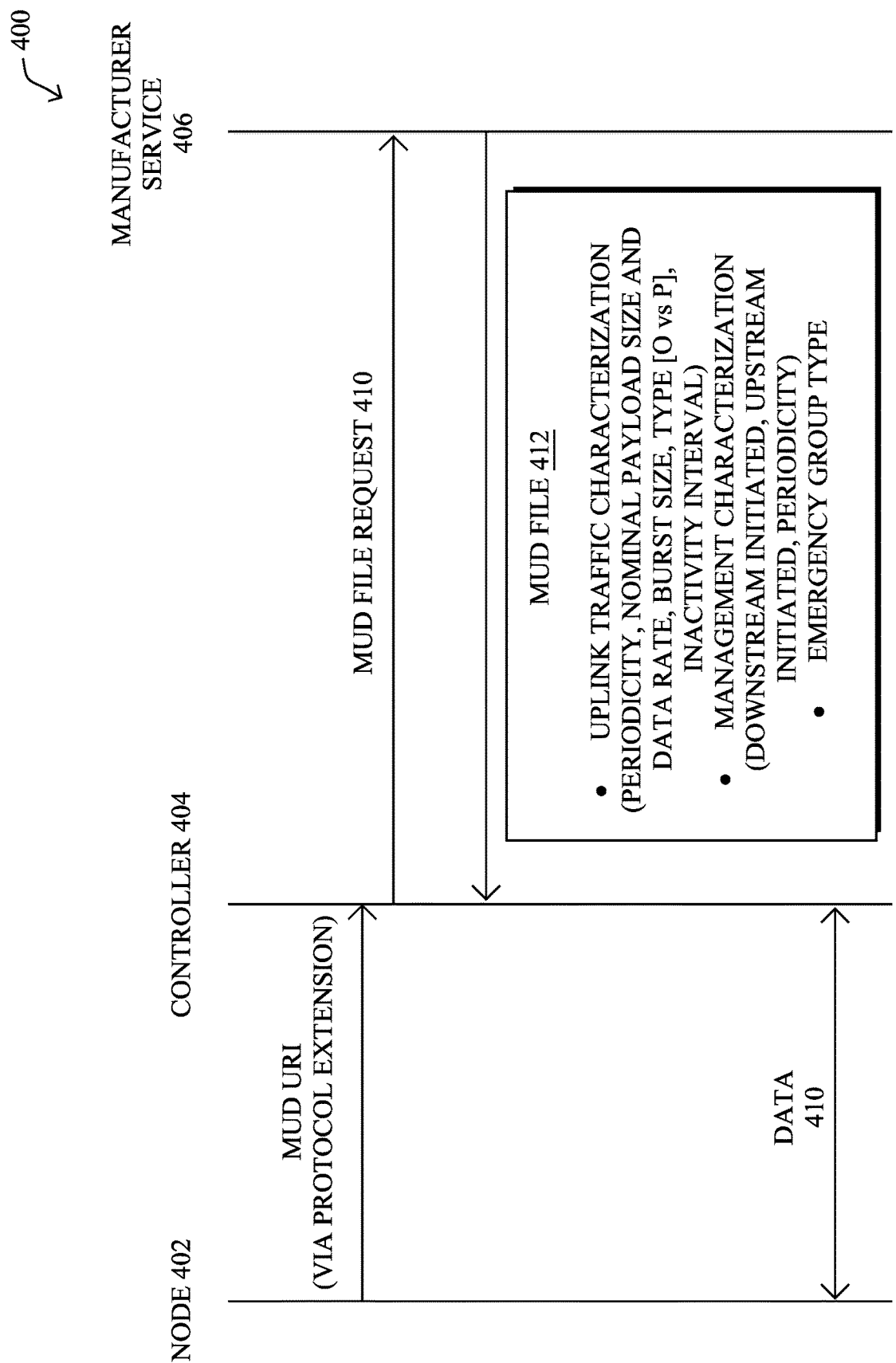
FIG. 4 illustrates an example diagram illustrating the fetching of a Manufacturer Usage Description (MUD) file.

An example diagram illustrating the fetching of a MUD file is shown in FIG. 4. As shown, assume that a node 402 joins a network that includes a controller 404. For example, controller 404 may be a wireless LAN controller (WLC) that supervises a wireless access point that provides network connectivity to node 402.

When node 402 joins the network, or in response to a request to do so, node 402 may send its MUD URI 408 to controller 404 (e.g., via a protocol extension, etc.). This signifies to controller 404 the location of manufacturer service 406, which may be accessible via the Internet. In turn, controller 404 may send a MUD file request to service 406 for the MUD file for node 402. Manufacturer service 406 then provides MUD file 412 to controller 404.

Typically, MUD file 412 will include information that can be used to identify the type of node 402. For example, MUD file 412 may indicate the manufacturer of node 402, the model of node 402, the type of node 402 (e.g., a smart light, a particular type of sensor, etc.). Using the contents of MUD file 412, controller 404 can then control how data 410 is exchanged between node 402 and the network (e.g., by applying security policies, traffic policies, etc. to node 402).

In various embodiments, the techniques herein propose including any or all of the following information in MUD file 412:

Uplink traffic characterization—e.g., periodicity, nominal payload size and data rate, min and peak payload size and data rate, burst size, type [O,P], inactivity interval, etc.

Management characterization—e.g., downstream-initiated, upstream-initiated, periodicity, etc.

Emergency group type—The emergency group type determines a categorization for the IoT object. Categorization can be generic (e.g. contact sensor) or specific (e.g. door opening sensor).

Referring again to architecture 300 in FIG. 3, node profile generator 304 may use the obtained MUD information 310, to determine the behavioral profiles of the wireless nodes in the network, if available. However, there are also cases in which MUD information 310 is not available for a given node in the network. For example, the node may be a legacy device that does not support the MUD protocol, the MUD URI for the device may be unreachable, etc.

If a node in the network does not have a behavioral profile available via MUD or from another source, wake time allocation process 248 may employ an observation mechanism, to learn the behavioral profile of the node. In one embodiment, transmission window assigner 308 may assign observation slots to nodes that have unknown behavioral profiles. Thus, a node with an unknown behavioral profile may be allowed to communicate with the network at certain times. In turn, traffic data 312 can be collected regarding these communications and used as input to the one or more traffic model(s) 302.

Generally speaking, traffic data 312 may include any or all information or measurements that can be collected from the network regarding a node with an unknown behavioral profile. For example, traffic data 312 may indicate the Modulation and Coding Scheme (MCS) used by the node during association time to associate with an access point of the network. Accounting for RF changes in the cell introduces an MCS variability, $m_v$, which can also be captured in traffic data 312 can calculated using traffic model(s) 302. This variability assigns a probabilistic deviation, s, to each node MCS, which can be computed using traffic model(s) 302. Another behavioral parameter, $m_v$, can also be computed by traffic model(s) 302 throughout the life of the cell, and changes for each node. Mobile nodes (e.g., nodes that change their physical locations over time) are expected to display a larger $m_v$ than static nodes. Also, cells with larger RF variation will exhibit $m_v$ values of larger mean that cells with stable RF conditions. For example, a traffic model 302 may compute $m_v$ over a large sliding window (e.g., 5 sec or another suitable window size).

In one embodiment, traffic model(s) 302 can also determine the emergency group characterization of the node based on traffic data 312. For example, traffic data 312 can include information learned about the node at association time, such as its static assignment through MAC OUI, traffic patterns, etc.). The periodicity of the node can also be determined by model(s) 302 from traffic data 312. Using the modeled information from traffic model(s) 302 regarding the node, node behavioral profile generator 304 can then generate a behavioral profile for the node (e.g., in the same format as profiles those profiles derived from their available MUD information 310).

Figure 5A:
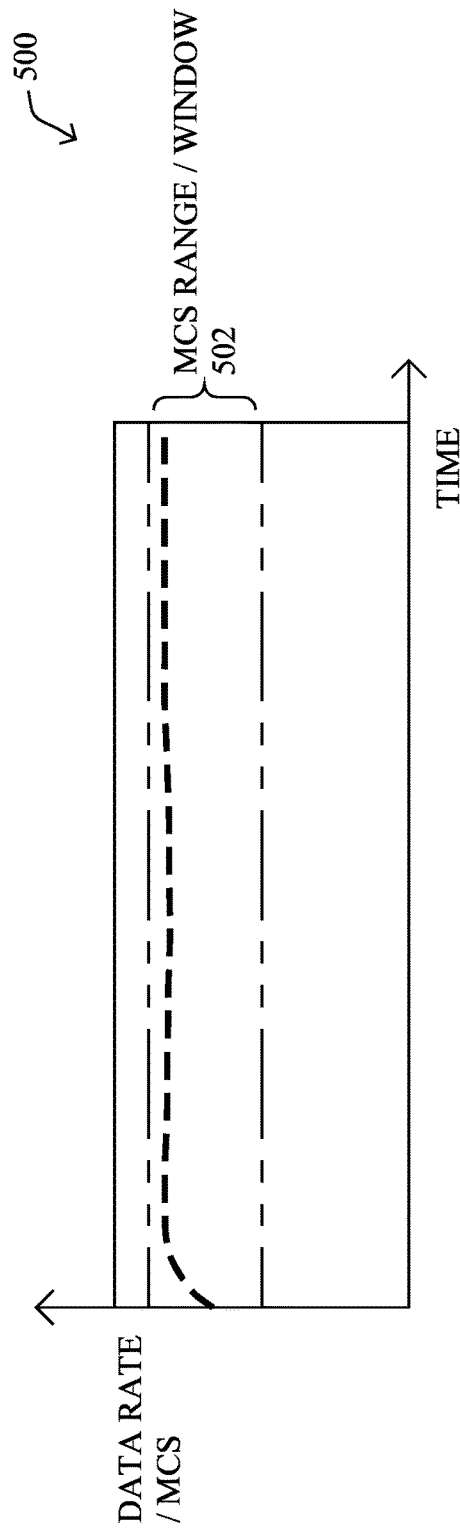
FIGS. 5A-5B illustrate example device data rates observed in a network.
Figure 5B:
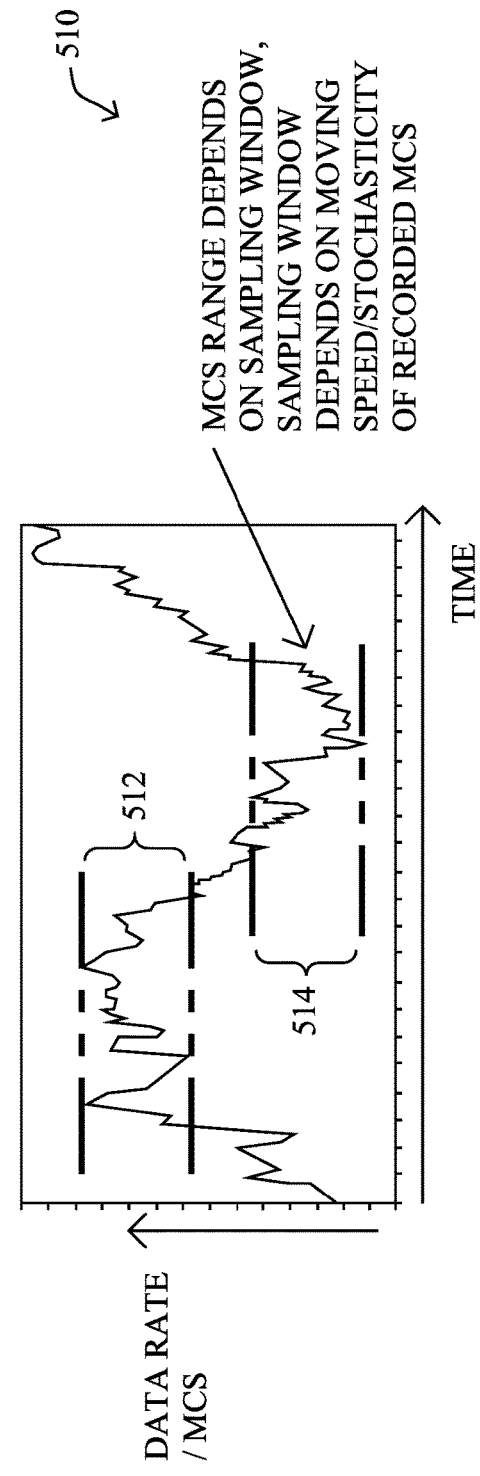

FIGS. 5A-5B illustrate example device data rates observed in a network, in various embodiments. In FIG. 5A, plot 500 illustrates the observed data rate/MCS for a node in the network over time. As can be seen, the MCS range is fairly stable within window 502. This is fairly typical for stationary nodes, such as a door entry sensor. In FIG. 5B, plot 510 similarly illustrates the observed data rate/MCS for another node in the network over time. In this case, however, it can be seen that the observed MCS range is highly dependent on the sampling window. For example, the data rate/MCS is much higher in the first window 512 than in window 514. This may be more typical in cases where the node is mobile, as the data rate can be a function of the moving speed of the node and stochasticity of the recorded MCS.

Referring again to FIG. 3, wake time allocation process 248 may determine the observation window used for each service period, which is a period between beacons during which unclassified nodes have uncontrolled access to the upstream traffic. Note that target wake timers allow these nodes to wake at the beginning of that window and a trigger frame can be sent to nodes in that group to allow those nodes with buffered traffic to send the traffic. The observation window allows wake time allocation process 248 to learn the traffic pattern of an unknown/new IoT transmitter (e.g., using traffic model 302 on the observed traffic data 312). Known transmitters can then be moved to other structured transmission windows. The window size and periodicity is a function of the already existing groups in the cell. Cells with no group can allocate up to 100% of target beacon transmission time (TBTT) to observation, while cells with existing group may allocate, for example, two observation slots of 20% of each TBTT.

According to various embodiments, based on the behavioral profiles of the nodes (e.g., either provided via MUD or observed), wake time allocation process 248 may assign each node to a specific target wake time/upstream group, based on the behavioral groups of the nodes. To do so, similarity evaluator 306 may receive the behavioral profiles generated by node profile generator 304 and, in turn, form groups of nodes that behave similarly. From this similarity information, transmission window assigner 308 can assign the various nodes to uplink transmission windows, which can be enforced by sending wake time commands 316 on to the nodes.

The first order of grouping that similarity evaluator 306 may perform can be based on transmission duration, q, of a node. For example, similarity evaluator 306 may allocate nodes to common groups that have similar peak payloads (e.g., converted to transmission duration based on a current mean MCS) and transmission intervals. In one embodiment, similarity evaluator 306 may also enforce a rule that any such group can include one or more P-type transmitters (e.g., nodes that transmit periodically) and one or more O-type transmitters (e.g., nodes that transmit occasionally).

A second order of grouping that similarity evaluator 306 may apply is based on the probabilistic deviation, s, of the MCS of a node. In one embodiment, similarity evaluator 306 may group P-type nodes with similar payload durations and similar deviations together. Such a group can be used, for example, by transmission window assigner 308 to fill the OFDMA slots for a given transmission group. As would be appreciated, "slots" are referred to in the generic sense herein and can include any subdivision or allocation of a communication schedule, such as resource units (RUs) and the like. In one embodiment, transmission window assigner 308 may use a linear function to determine the filling percentage of the upstream frame. For example, transmitters with lower deviation are allowed to fill a larger set of the frame, as they are expected to be more predictable. Transmission window assigner 308 can then feed the result into a linear system that determines the quantity of uplink frames needed by each group in each service period, and assign nodes to uplink windows, accordingly.

A third order of grouping that similarity evaluator 306 may apply can be based on $m_v$, to trigger the periodicity of group membership refresh. Notably, large $m_v$ values for a group may trigger similarity evaluator 308 to compute the group membership more frequently. Incoming downstream management traffic can also trigger a membership re-computation, in some cases.

As noted, transmission window assigner 308 can use the groups of similarly behaving nodes from similarity evaluator 306, to form transmission groups that can be assigned to certain uplink transmission windows. In one embodiment, each transmission group that contains one or more P-type nodes may also include one or more O-type nodes. The first order of this allocation that transmission window assigner 308 may use can be based on the expected transmission duration, q, of the node. The next order of allocation that transmission window assigner 308 may employ can be based on the emergency group type of a node. In turn, in some embodiments, transmission window assigner 308 may spread O-type nodes with similar q values and similar group types across transmission groups. Notably, two or more similar O-type nodes are likely to attempt to transmit at the same time than two or more O-type nodes of different types.

Transmission window assigner 308 may assign each transmission group to an upstream transmission window, based on the computed transmission duration for the group. Such a transmission window may account for the traffic needs of the P-type node(s) in the transmission group. In addition, transmission window assigner 308 may assign O-type nodes to the transmission group in a round robin fashion, where O-type nodes are divided among transmission groups that can support the traffic and periodicity of the O-type nodes. For example, transmission window assigner 308 may slot critical O-type nodes (e.g., smoke detectors) in each transmission window. Conversely, transmission window assigner 308 may slot O-type nodes with non-critical traffic (e.g., ambient temperature sensors) to every tenth transmission window.

Figure 6:
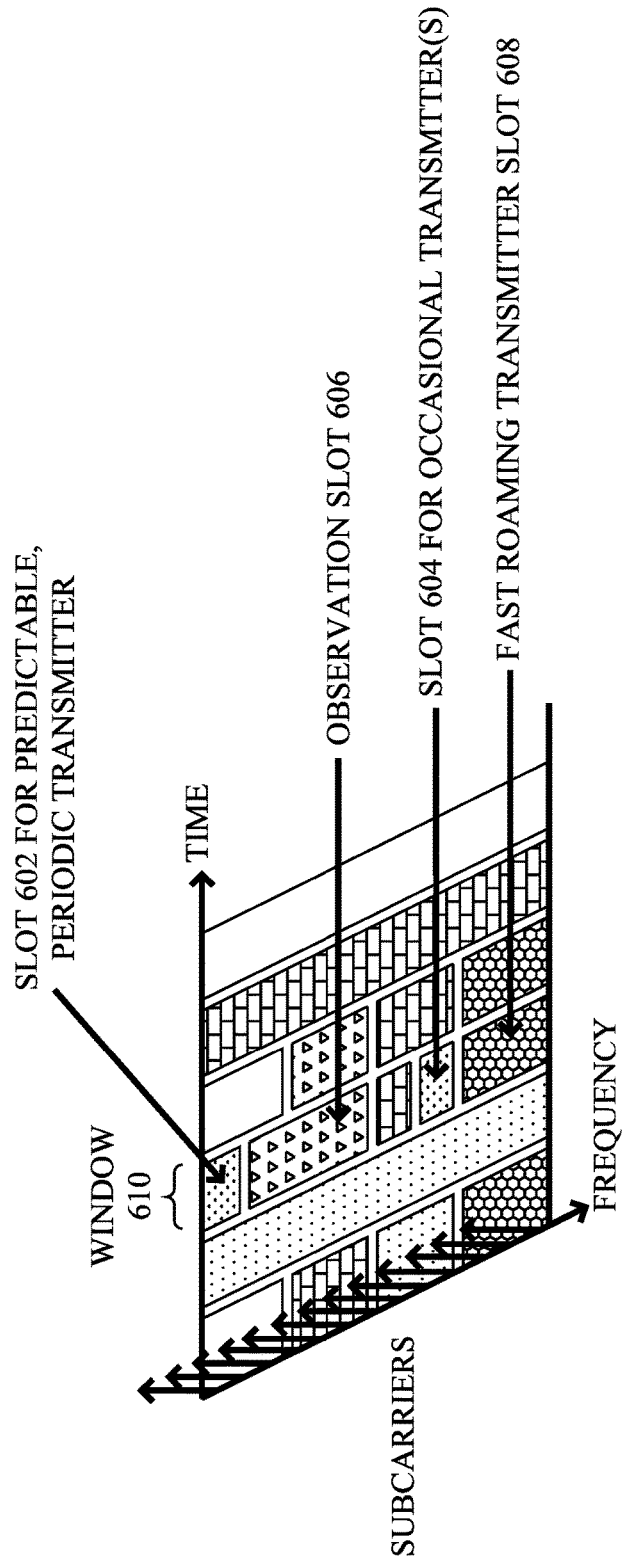
FIG. 6 illustrates an example of assignments to a transmission window.

FIG. 6 illustrates an example of OFDMA transmission assignments 600, in various embodiments. As shown, assume that transmission window assigner 308 is to assign various nodes in the network to a transmission window 610. Each slot may, by definition, designate the time, frequency, and subcarrier assigned to one or more nodes for uplink transmission. According to the techniques herein, slots in a given transmission window can be assigned based on the behavioral profiles of the nodes in the transmission group.

By way of example, slot 602 of window 610 may by assigned to P-type node whose traffic is predicable. Similarly, one or more O-type transmitters can also be assigned to slot 604 in this transmission window. In some embodiments, an observation slot 606 in window 610 can also be assigned to one or nodes whose behavioral profiles are unknown, allowing for their traffic patterns to be observed. In another embodiment, the transmission window 610 may also include a slot 608 to support a fast roaming node. Note that slot 608 may be sized larger than the expected duration for the node, to account for the $m_v$ of the node (e.g., MCS degradation can result in a longer transmission time for the slot).

In other words, target wake time values can be assigned to a transmission group of nodes, based on the transmission characteristic and member criticality of the nodes. A group with P-type members receives a target wake time value that allows for transmission of the learned expected P traffic (e.g., x bps for all contributing members translated, based on individual MCS and $m_v$, into y frames over the next service period). Space available in each transmission window, based on the q and s of the P-type members, is also allocated to one or more O-type nodes with compatible q values. For example, differently behaving O-type nodes and similar q values may be included in the same transmission group and target wake time values sent to the individual nodes.

Figure 7:
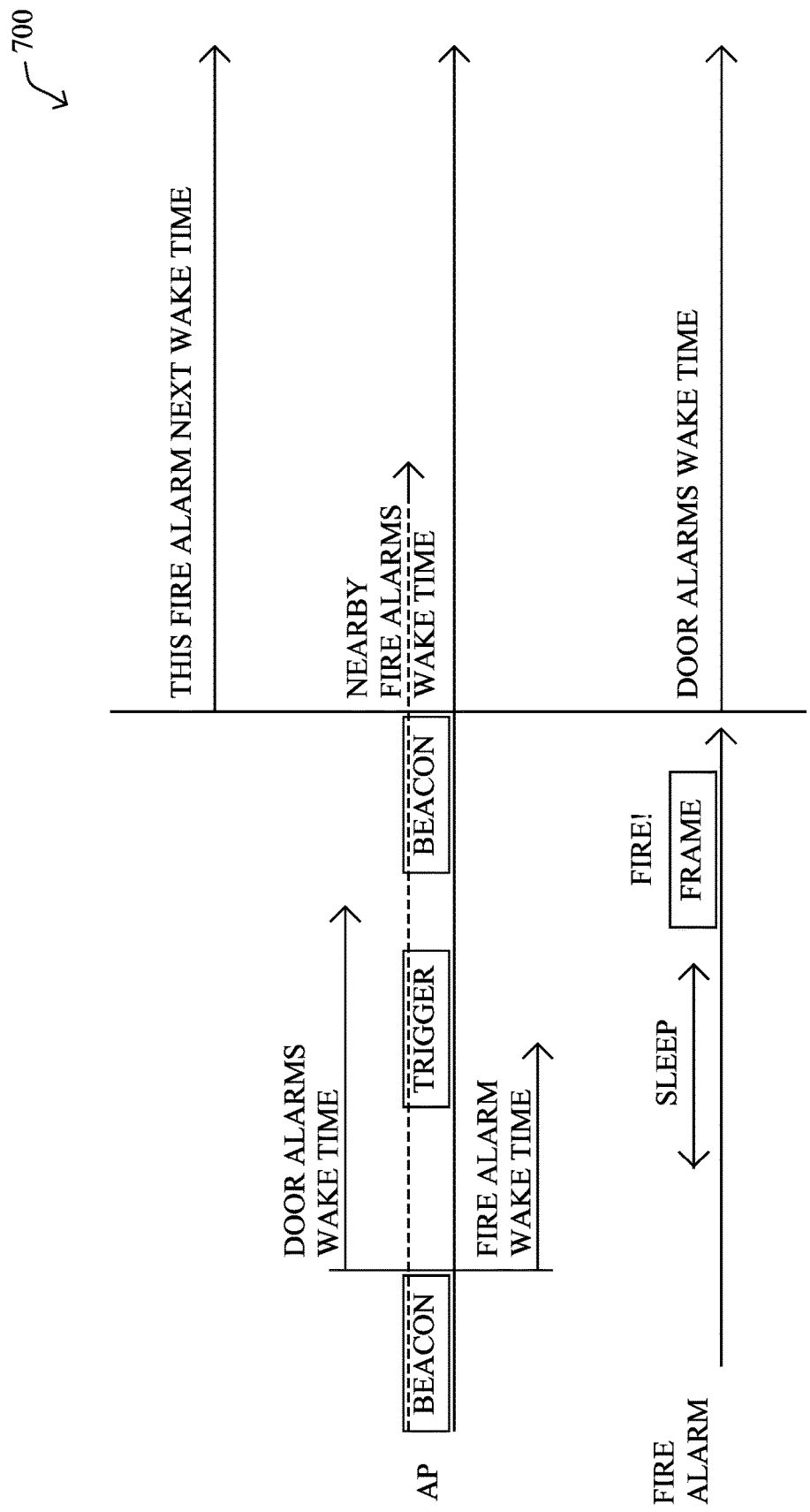
FIG. 7 illustrates an example of re-assigning transmission windows in response to an event.

Referring again to FIG. 3, it should be noted that the assignments by transmission window assigner 308 can also be re-computed dynamically, such as due to $m_v$ changes/re-computations. In further embodiments, transmission window assigner 308 may also re-compute the transmission groups and their assignments based on event information 314 from the network that may indicate the presence of a triggering event. For example, FIG. 7 illustrates an example 700 of a fire alarm signaled in the network that could cause transmission window assigner 308 to change the slotting structure. In the example shown, other fire detectors can be allocated a higher slotting frequency in the same or neighboring cells. However, the fire detector that reported the alarm can be de-promoted and slotted every twenty transmission windows (e.g., fire is already signaled, next event is no-fire, which has lower emergency). Similarly, the fire alarm can trigger an increase in the slot availability allocated to video cameras and other UP 6 traffic (e.g. emergency calls), while door sensors get de-promoted to a slower transmission interval (e.g., in case of fire, emergency exits are expected to open and signaling door open events is of secondary importance).

This dynamic allocation allows for optimization of the wireless resources, especially in times where standard collision mechanisms will fail (e.g., all fire, door and other alarms firing up at the same time and sending alarm messages continuously, while humans attempt to place 911 calls in the same RF cell), and can be dynamically computed based on each participating node type, or be manually configured by an operator.

Figure 8:
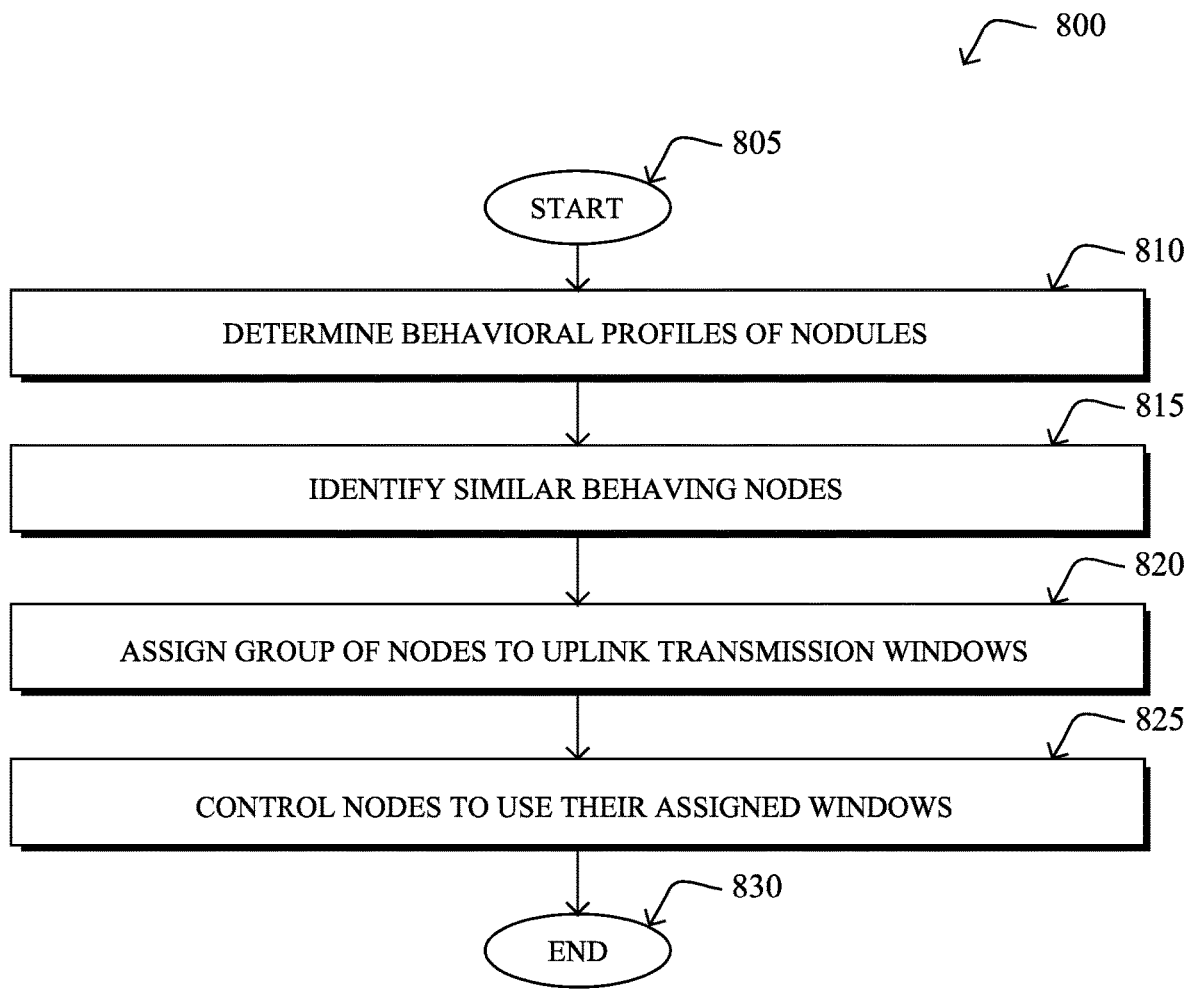
FIG. 8 illustrates an example simplified procedure for assigning transmission windows to network nodes.

FIG. 8 illustrates an example simplified procedure for assigning transmission windows to network nodes, in a network in accordance with one or more embodiments described herein. For example, a non-generic, specifically configured device (e.g., device 200) may perform procedure 800 by executing stored instructions (e.g., process 248). For example, the device may comprise a wireless access point or a controller or other supervisory device that controls one or more access points. The procedure 800 may start at step 805, and continues to step 810, where, as described in greater detail above, the device may determine behavioral profiles of a plurality of nodes in the network. In general, the behavioral profile of a particular node may indicate the traffic profile for the node over time. In some embodiments, the behavioral profile for a particular node indicates whether the node is an occasional transmitter or a periodic transmitter. In further embodiments, the behavioral profile may also indicate the emergency group type of the node (e.g., whether transmissions from the node are associated with a certain type of emergency). In various embodiments, the device may determine the behavioral profile of a node either by obtaining MUD files for the node or by assigning the node to observation slots of transmission windows and observing the transmissions made by the node in these observation slots.

At step 815, as detailed above, the device may identify similarly behaving nodes based on their behavioral profiles. For example, nodes may be considered similar based on their periodicity (e.g., whether the node transmits periodically or occasionally, when they communicate, etc.), transmission durations, MCS deviations, or the like.

At step 820, the device may assign groups of the nodes to uplink transmission windows based on their behavioral profiles, as described in greater detail above. For example, such uplink transmission windows may be UL-MUMIMO or OFDMA windows. In various embodiments, the device may assign similarly behaving nodes that are periodic transmitters to the same uplink transmission windows and similarly behaving nodes that are occasional transmitters to different uplink transmission windows. As would be appreciated, spreading out the transmissions by occasional transmitters of the same type helps to avoid them attempting to transmit at the same time.

At step 825, as detailed above, the device may control the plurality of nodes to use their assigned uplink transmission windows via target wake time values sent to the plurality of nodes. In various embodiments, target wake time values can be sent to the nodes (e.g., via the one or more access points to which they are attached), to control which nodes are able to send uplink transmissions at any given point in time. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the organization of uplink transmissions in a network based on profiles of the various nodes in the network (e.g., transmission needs in terms of intervals and volumes, predictability, duration variation, emergency level, etc.). Such grouping can be used to allocate UL-MUMIMO or OFDMA frames slots, to optimize the upstream utilization of the link. In addition, the techniques herein can also be applied dynamically, to take into account certain events, such as fire alarm.

While there have been shown and described illustrative embodiments that provide for a target wake time and grouping scheme in a network, it is to be understood that various other adaptations and modifications may be made within the spirit and scope of the embodiments herein. For example, while certain embodiments are described herein with respect to using certain models for purposes of behavioral profiling, the models are not limited as such and may be used for other functions, in other embodiments. In addition, while certain protocols are shown, such as 802.11, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   determining, by a device in a network, behavioral profiles of a plurality of nodes in the network, wherein the behavioral profile for a particular node indicates whether the node is an occasional transmitter or a periodic transmitter;
   identifying, by the device, similarly behaving nodes based on their behavioral profiles;
   assigning, by the device, groups of the nodes to uplink transmission windows based on their behavioral profiles, wherein similarly behaving nodes that are periodic transmitters are assigned to the same uplink transmission windows and similarly behaving nodes that are occasional transmitters are assigned to different uplink transmission windows,
   wherein groups of nodes are assigned by applying a linear function of a probabilistic deviation of a modulation and coding set (MCS) of a node in the plurality, to determine an amount of an uplink transmission window that the node would fill; and
   controlling, by the device, the plurality of nodes to use their assigned uplink transmission windows via target wake time values sent to the plurality of nodes.

2. The method as in claim 1, wherein determining the behavioral profiles of the plurality of nodes in the network comprises:
   obtaining Manufacturer Usage Description (MUD) files for the nodes, wherein an obtained MUD file for a node indicates an uplink traffic characterization for the node, a management characterization for the node, and an emergency group type for the node.

3. The method as in claim 1, wherein determining the behavioral profiles of the plurality of nodes in the network comprises:
   assigning a node in the plurality to observational slots in the one of the uplink transmission windows; and
   observing transmissions made by the node in the observational slots, to determine the behavioral profile of the node.

4. The method as in claim 1, wherein the uplink transmission windows are Orthogonal Frequency-Division Multiple Access (OFDMA) or Uplink-Multiple User, Multiple-Input, Multiple-Output (UL-MUMIMO) transmission windows.

5. The method as in claim 1, wherein identifying the similarly behaving nodes based on their behavioral profiles comprises:
   identifying nodes that have similar buffer state information and transmission intervals.

6. The method as in claim 1, further comprising:
   dynamically re-assigning, by the device, the plurality of nodes to the uplink transmission windows, in response to a triggering event.

7. The method as in claim 6, wherein the triggering event corresponds to an emergency event, and wherein the device dynamically re-assigns the plurality of nodes to the uplink transmission windows based on node criticality information in the behavioral profiles of the nodes.

8. The method as in claim 1, wherein the device comprises a controller for one or more wireless access points in the network that send the target wake time values to the plurality of nodes.

9. An apparatus, comprising:
   one or more network interfaces to communicate with a network;
   a processor coupled to the network interfaces and configured to execute one or more processes; and
   a memory configured to store a process executable by the processor, the process when executed configured to:
      determine behavioral profiles of a plurality of nodes in the network, wherein the behavioral profile for a particular node indicates whether the node is an occasional transmitter or a periodic transmitter;
      identify similarly behaving nodes based on their behavioral profiles;
      assign groups of the nodes to uplink transmission windows based on their behavioral profiles, wherein similarly behaving nodes that are periodic transmitters are assigned to the same uplink transmission windows and similarly behaving nodes that are occasional transmitters are assigned to different uplink transmission windows, wherein groups of nodes are assigned by applying a linear function of a probabilistic deviation of a modulation and coding set (MCS) of a node in the plurality, to determine an amount of an uplink transmission window that the node would fill; and control the plurality of nodes to use their assigned uplink transmission windows via target wake time values sent to the plurality of nodes.

10. The apparatus as in claim 9, wherein the apparatus determines the behavioral profiles of the plurality of nodes in the network by:

obtaining Manufacturer Usage Description (MUD) files for the nodes, wherein an obtained MUD file for a node indicates an uplink traffic characterization for the node, a management characterization for the node, and an emergency group type for the node.

11. The apparatus as in claim 9, wherein the apparatus the behavioral profiles of the plurality of nodes in the network by:

assigning a node in the plurality to observational slots in the one of the uplink transmission windows; and observing transmissions made by the node in the observational slots, to determine the behavioral profile of the node.

12. The apparatus as in claim 9, wherein the uplink transmission windows are Orthogonal Frequency-Division Multiple Access (OFDMA) or Uplink-Multiple User, Multiple-Input, Multiple-Output (UL-MUMIMO) transmission windows.

13. The apparatus as in claim 9, wherein the apparatus identifies the similarly behaving nodes based on their behavioral profiles by:

identifying nodes that have similar buffer state information and transmission intervals.

14. The apparatus as in claim 9, wherein the process when executed is further configured to:

dynamically re-assign the plurality of nodes to the uplink transmission windows, in response to a triggering event.

15. The apparatus as in claim 14, wherein the triggering event corresponds to an emergency event, and wherein the apparatus dynamically re-assigns the plurality of nodes to the uplink transmission windows based on node criticality information in the behavioral profiles of the nodes.

16. The apparatus as in claim 9, wherein the apparatus comprises a controller for one or more wireless access points in the network that send the target wake time values to the plurality of nodes.

17. The apparatus as in claim 9, wherein a particular target wake time value causes a node in the plurality to wake at a start time of an uplink transmission window assigned to that node.

18. A tangible, non-transitory, computer-readable medium storing program instructions that cause a device in a network to execute a process comprising:

determining, by the device in the network, behavioral profiles of a plurality of nodes in the network, wherein the behavioral profile for a particular node indicates whether the node is an occasional transmitter or a periodic transmitter;

identifying, by the device, similarly behaving nodes based on their behavioral profiles;

assigning, by the device, groups of the nodes to uplink transmission windows based on their behavioral profiles, wherein similarly behaving nodes that are periodic transmitters are assigned to the same uplink transmission windows and similarly behaving nodes that are occasional transmitters are assigned to different uplink transmission windows, wherein groups of nodes are assigned by applying a linear function of a probabilistic deviation of a modulation and coding set (MCS) of a node in the plurality, to determine an amount of an uplink transmission window that the node would fill; and controlling, by the device, the plurality of nodes to use their assigned uplink transmission windows via target wake time values sent to the plurality of nodes.

19. The tangible, non-transitory, computer-readable medium as in claim 18, wherein the process when executed is further configured to:

dynamically re-assign the plurality of nodes to the uplink transmission windows, in response to a triggering event.

20. The tangible, non-transitory, computer-readable medium as in claim 19, wherein the triggering event corresponds to an emergency event, and wherein the device dynamically re-assigns the plurality of nodes to the uplink transmission windows based on node criticality information in the behavioral profiles of the nodes.

* * * * *